United States Patent [19]

de Cuissart

[11] 4,360,974
[45] Nov. 30, 1982

[54] DEVICE FOR RELATIVE POSITIONING OF TWO OBJECTS

[75] Inventor: Jean D. de Cuissart, Vitry sur Seine, France

[73] Assignee: Mecalix, France

[21] Appl. No.: 208,832

[22] Filed: Nov. 17, 1980

[30] Foreign Application Priority Data

Nov. 26, 1979 [FR] France ............................. 79 29071

[51] Int. Cl.³ .......................................... B23B 35/00
[52] U.S. Cl. ................................. 33/180 R; 33/174 H
[58] Field of Search .............. 33/180 R, 184.5, 174 H, 33/174 L; 248/661, 662, 663, 660

[56] References Cited

U.S. PATENT DOCUMENTS

| 2,211,825 | 8/1940 | Kindelmann et al. | 248/11 |
| 2,680,397 | 6/1954 | Saunders | 88/40 |
| 2,960,806 | 11/1960 | Kunzler | 51/237 |
| 3,168,273 | 2/1965 | Warnery | 248/157 |
| 3,424,413 | 1/1969 | Applegate | 248/23 |
| 3,722,360 | 3/1973 | Blakey et al. | 33/180 R |

FOREIGN PATENT DOCUMENTS

| 502972 | 7/1930 | Fed. Rep. of Germany . |
| 641201 | 10/1935 | Fed. Rep. of Germany . |
| 1569773 | 4/1969 | France . |
| 1580122 | 7/1969 | France . |
| 545748 | 6/1942 | United Kingdom . |
| 2018171 | 10/1979 | United Kingdom . |

Primary Examiner—William D. Martin, Jr.
Attorney, Agent, or Firm—Steinberg & Raskin

[57] ABSTRACT

The present invention relates to a device for relative positioning of two objects, which comprises a means with a ball provided a spherical bearing surface between two objects and a means with a cylindrical bar providing a cylindrical bearing surface between the two objects and a means with a truncated ball providing a planar bearing surface between the two objects. This device applies for example to the accurate positioning of measuring assemblies which must be frequently removed and repositioned in automatic checking machines.

8 Claims, 6 Drawing Figures

DEVICE FOR RELATIVE POSITIONING OF TWO OBJECTS

The present invention relates to and has essentially for its subject matter a device for accurate relative positioning of two objects.

The solution is already known of positioning two objects with respect to one another, known as the "point-line-plane" method.

This known solution consists in fixing in the planar surface of one of the objects three balls spaced from one another and intended to be brought into contact with a planar surface of the other object. More precisely, one of the balls is received in a conical cavity machined in the planar surface of the other object, the second ball is received in a prismatic cavity formed in the planar surface of the other object and in which the said ball is linearly displaceable, and the third ball is simply brought into contact with the planar surface of the other object. The three balls form, as it were, the three vertices of a triangle in the plane of the object to which they are fixed, so that when the first ball is in contact with the conical cavity, the second ball rests at two points on the prismatic cavity and the third ball is in point contact with the planar surface of the other object.

This prior solution has hitherto proved to be satisfactory for accurate positioning of two objects with respect to one another when the forces or, efforts transmitted by the balls are small and constant and the two objects are not frequently disconnected from one another.

If, on the contrary, the object to be positioned on the other object has considerable weight, i.e. if the efforts transmitted by the balls are important and variable, the relative positioning of the two objects may be altered after successive positionings. This results from the fact that the contact of the first ball with the conical cavity is circular and linear and that the contact of the two other balls with the prismatic cavity and the planar surface of the other object is a point contact. Otherwise stated, owing to the said linear and point contacts, the balls may somewhat subside in the long run after several positionings of the two objects, so that accurate and rigorous positioning of the latter can no longer be ensured. Moreover, the positioning of the two objects is affected by an effort variation causing various deformations due to the presence of a linear contact and of several point contacts.

The purpose of the present invention is to remedy particularly the above drawbacks by providing a new device for positioning two objects which is particularly reliable, inexpensive and owing to which the relative position of the two objects can in no circumstances be disturbed by the importance and/or the variation of the application efforts.

To this end, the invention provides a device for relative positioning of any two objects through the medium of three points spaced one from another and constituted by two balls connected to the planar surface of one of the two objects and intended to be brought into contact with the other object, one of the two balls engaging into a cavity provided in the planar surface of the other object and the other ball being in contact with the said planar surface, and by a third bearing member connected to one of the two objects and brought into linearly displaceable contact with an associated rectilinear guiding abutment connected to the other object, the said device being characterized in that the contact of the two balls with the cavity and the planar surface of the other object, respectively, as well as the contact of the third bearing member with the said guiding abutment take place on associated bearing surfaces.

It is therefore already understood that the device according to the invention, which constitutes a connection of the isostatic type, allows excellent positioning accuracy in case of important effort variations and frequently repeated positionings. Indeed, this device provides three bearing surfaces, which was not the case in the prior solutions which provided linear and point contacts and involved a risk of rapid and different wear at the three contacts depending on the number of repeated positionings.

According to another characterizing feature of the invention, one of the balls provides a spherical bearing surface cooperating with a corresponding spherical supporting surface provided in the other object, the other ball provides a planar bearing surface cooperating with a planar supporting surface of the other object, and the third bearing member connected to one of the objects comprises at least one cylindrical supporting surface which cooperates with the corresponding cylindrical bearing surface provided on the guiding abutment connected to the other object.

Thus, the associated bearing surfaces are spherical, planar and cylindrical, respectively.

The device according to the invention is also characterized in that two spherical recesses are provided in one of the objects to receive one and the other balls, the latter comprising a flat portion cooperating with the planar surface of the other object, whereas the aforesaid guiding abutment is constituted by a cylindrical bar whose axis passes through the center of the first-mentioned ball.

It will also be noted that, according to the invention, the spherical recesses receiving the balls, as well as the said cylindrical bar, are provided in and on intermediate elements connected to one of the objects, whereas the aforesaid spherical, planar and cylindrical bearing surfaces are also provided and machined in intermediate elements connected to the other object.

According to still another characterizing feature, each intermediate element is secured to the object with which it is associated by a screw and, if appropriate, by a centering ring.

According to another characterizing feature, the two balls are retained in their respective recesses by an annular member fixed to the intermediate element, and at least the ball provided with the said flat portion is capable of rolling and pivoting in its recess.

Also, the intermediate element comprising the aforesaid cylindrical bar is the form of a clevis or yoke supporting the said bar and keyed to one of the objects.

According to still another characterizing feature of the invention, the intermediate element provided with the cylindrical supporting surface or surfaces rests upon the cylindrical bar between the two arms of the said clevis.

The invention is also directed to a machine or an assembly using at least one device having the aforementioned characterizing features.

Other characterizing features and advantages of the invention will appear more clearly from the following detailed description with reference to the appended drawings given solely by way of example and wherein.

Figure 1:
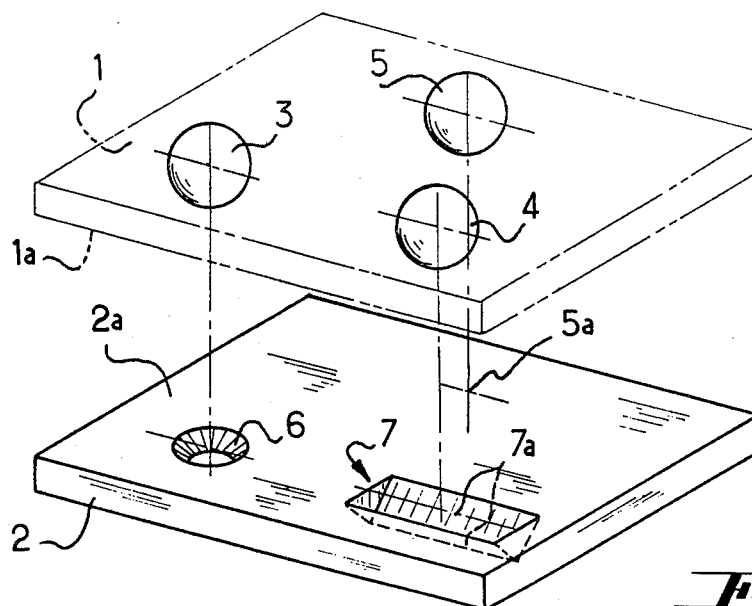
FIG. 1 is a somewhat diagrammatic perspective view of a device for relative positioning of two objects according to the prior art.

Reference is first made to FIG. 1 showing a device for relative positioning of two objects 1 and 2 according to the prior art.

As seen in this Figure, three balls 3, 4 and 5 are fixed to the planar surface 1a of the object 1 intended to be positioned on the object 2. In the planar surface 2a of the latter and with the same spacing as that of the balls 3, 4 and 5, are machined a conical cavity 6 in which the ball 3 is intended to rest, and a cavity 7 of prismatic shape intended to receive the ball 4, whereas the ball 5 simply rests on the planar surface 2a of the object 2.

In this prior device, the contact of the ball 3 with the conical cavity 6 is a circular and linear contact, the contact of the ball 4 with the prismatic cavity 7 is a point contact (one contact point on each face 7a of the cavity 7), and the contact of the ball 5 with the planar surface 2a of the object 2 is simply a point contact shown at 5a.

It is therefore understood that the aforesaid linear contact and point contacts are subjected to rapid and different wear depending on the number of repeated positionings of the object 1 on the object 2. This means that the accuracy of the relative positioning of the two objects 1 and 2 in case of important effort variations and frequently repeated positionings, cannot be rigorously ensured.

The device according to the invention shown in FIGS. 2 to 6 eliminates the above drawbacks by being provided with three means 10, 20 and 30 ensuring the positioning of two objects 1 and 2 through three contacts which take place at associated bearing surfaces, thus allowing important and variable efforts to be withstood without involving any risk of wear. Those three means 10, 20 and 30 will be described hereafter and successively with more particular reference to FIGS. 3 to 6.

Figure 3:
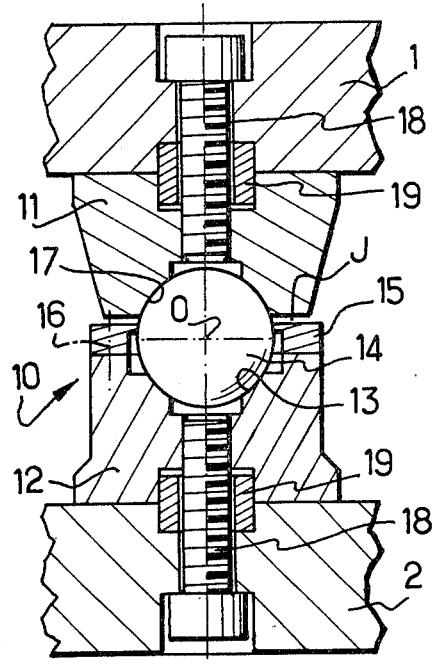
FIG. 3 is an elevational and vertical sectional view of one of the said means.

According to the form of embodiment illustrated in FIG. 3, the means 10 comprises two intermediate elements 11 and 12 fixed on the objects 1 and 2, respectively. The element 12 is provided with a spherical-wall recess 13 which receives a ball 14 applied and maintained in its recess by an annular member 15. The member 15 is fixed to element 12 serving as a support for the ball 14 by any appropriate means, as shown diagrammatically at 16. In the element 11 is machined a supporting spherical surface 17 corresponding to the spherical bearing surface of the ball 14. A clearance J is provided between the element 11 and the annular member 15 when the element 11 rests upon the ball 14. The intermediate elements 11 and 12 are fixed to the objects 1 and 2, respectively, by any appropriate means, such as for example screws 18 passing through centering rings 19.

Thus, the bearing surface constituted by a spherical surface of the ball 14, and the spherical supporting surface 17 of the element 11 allow the object 1 to rotate about the point O, i.e., the center of the ball 14, within the limits of the clearance J. It should be noted at this point that the means 10 is generally called "a point".

Figure 5:
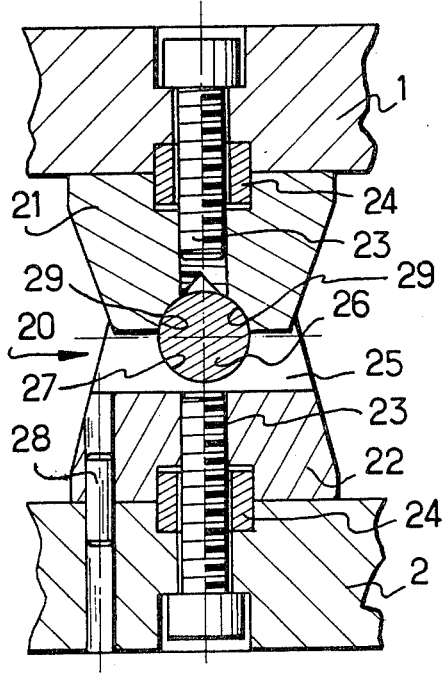
FIG. 5 is still another elevational and sectional view, taken along line V—V of FIG. 6, of the third means.
Figure 6:
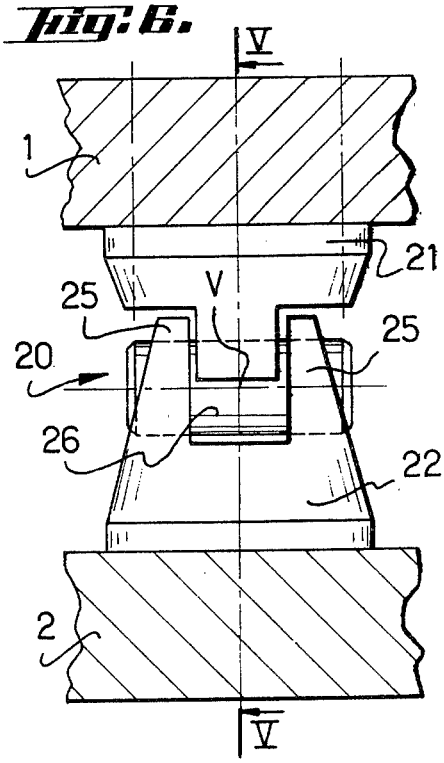
FIG. 6 is an elevational and side view of the third means illustrated in FIG. 5.

According to the form of embodiment illustrated in FIGS. 5 and 6, the means 20, commonly called "a line", is composed of two intermediate elements 21 and 22, respectively, fixed to the objects 1 and 2 by any suitable means, such as for example screws 23 passing through centering rings 24, as in the case of the means 10 described previously. According to a preferred form of embodiment, the element 22 constitutes a clevis or yoke the arms 25 of which carry a cylindrical bar 26. The latter is rectified and preferably tightly fitted into two bores 27 provided in the arms 25 of the clevis 22. At 28 is shown a key or the like preventing any relative rotation of the clevis 22 and the object 2. In the element 21 are machined two cylindrical supporting surfaces 29 corresponding to the cylindrical bearing surface of the bar 26 and intended to bear upon the latter, as clearly seen in FIG. 5.

It should be noted that the clevis 22 and therefore the bar 26 are so positioned that the axis y of the bar passes through the center O of the ball 14 of the means 10, which constitutes the only positioning condition imposed by the system according to the invention. Consequently, the object 1 in contact with the object 2 through the medium of the means 10 and 20 has only one degree of freedom corresponding to a rotation about the axis y passing through the center O of the ball 14.

Figure 4:
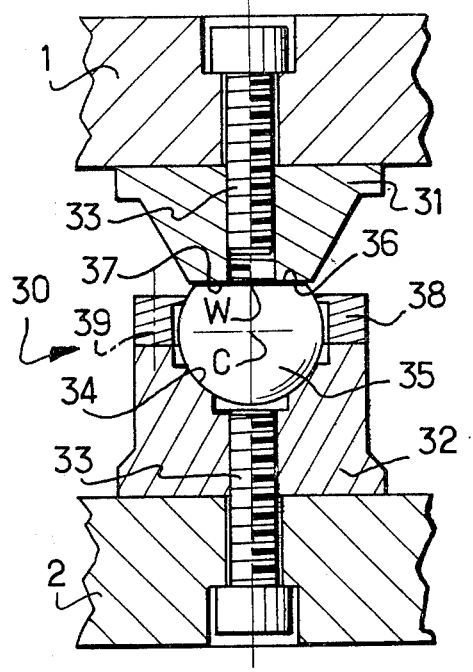
FIG. 4 is an elevational and vertical sectional view of the second means.

According to a preferred example of embodiment and as seen in FIG. 4, the means 30, commonly called "a plane", comprises two elements 31 and 32 secured to the objects 1 and 2, respectively, by appropriate fixing means such as for example screws 33. The element 32 is provided with a spherical-wall recess 34. The said recess receives a segmented ball 35 which therefore has a flat portion 36 forming a planar bearing surface adapted to cooperate with a planar supporting surface 37 of the intermediate element 31. The segmented ball 35 is retained in its recess 34 by an annular member 38 fixed to the intermediate element 32, as shown diagrammatically at 39. It is important to note that the annular member 39 retains the ball 35 while at the same time allows it to roll and pivot in its recess 34 so as to allow the flat portion 36 to coincide with the planar supporting surface 37 of the elements 31.

Thus, the object 1, while rotating about the axis y as seen previously, bears through the medium of the element 31 on the planar surface or flat portion 36 of the ball 35 pivoting about its center C in such a manner that the planar surface 36 merges with the planar supporting surface 37 of the element 31. Thereafter the ball 35 is secured by means of the annular member 38 fixed at 39 to the element 32 with, for example, screws.

Under such conditions, the three elements 11, 21 and 31 are in contact, by associated spherical, cylindrical and planar bearing surfaces, with the elements 12, 22 and 32. As a result, the relative position of the two objects 1 and 2 can be obtained with an accuracy of the order of one micron along the three axes X, Y and Z seen in FIG. 2. It will also be noted that the bearing surfaces provided by the three means 10, 20 and 30 must be equivalent so that the positioning is not affected by the effort of application of the object 1 with respect to the object 2. A distribution of the efforts is thus obtained. On the other hand, the choice of the position of the means 10, 20 and 30 will of course have to be adapted to the system of forces acting upon the object 1, in which case the object 2 is taken as a reference.

Figure 2:
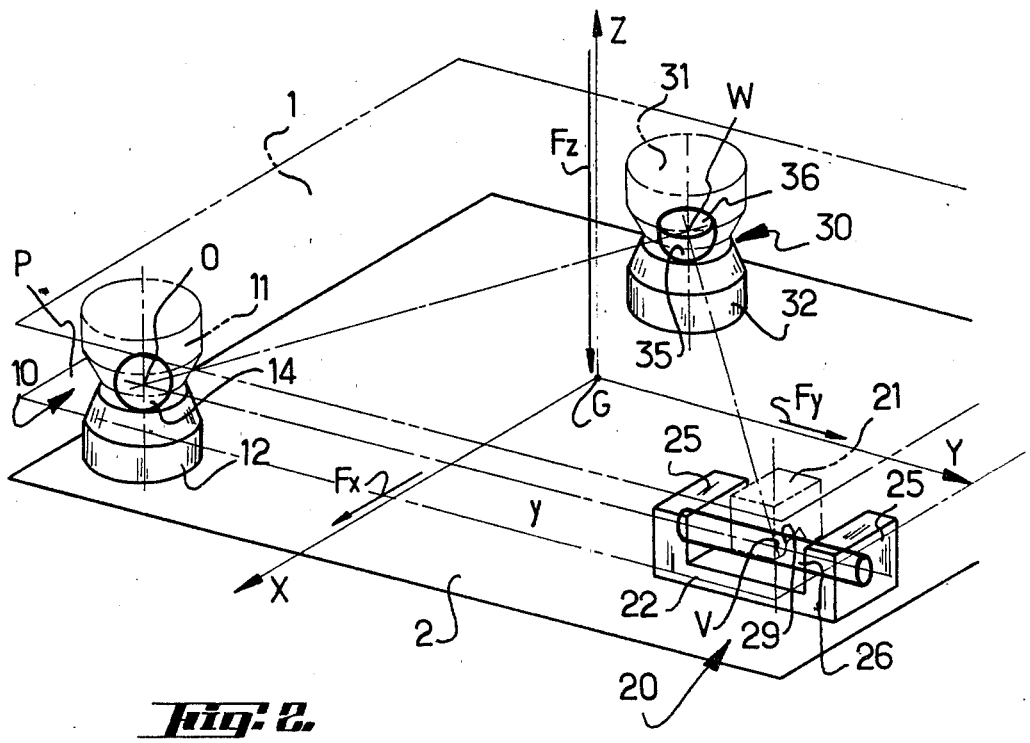
FIG. 2 is a diagrammatic perspective view of the positioning device comprising three points or means according to the invention.

To illustrate the foregoing considerations, the following will also be noted by referring more particularly to FIG. 2.

On this Figure is shown at P a plane passing through the point O which is the center of the ball 14, a point W corresponding to the contact of the flat portion 36 of the ball 35 with the planar supporting portion 37, and a point V which is the middle point of the axis y of the cylindrical bar 26, the said axis y being of course contained in the plane P. The origin of the three axes X, Y, Z of the reference trihedron seen in FIG. 2 is designated by the letter G, this point being the center of the circle circumscribed about the triangle O, W, V contained in the plane P. The axis G Z is thus perpendicular to the plane P, whereas the axis G X in the plane P is perpendicular to the axis y passing through the point O.

The resultant of the efforts exerted on the object 1 must pass approximately through the point G, and it has as a projection on the three axes Fz, Fy and Fx as seen in FIG. 2.

Fz must have a sufficient value to properly apply the elements 11, 21 and 31 onto the elements 12, 22 and 32, respectively, and use will be made, as a rule, of a pneumatic or hydraulic actuator to exert the effort. Fy must be of small value, e.g. less than 1/10 of Fz. Lastly, Fx may have, for example, a value equal to ¼ of Fz. Usually, Fx and Fy are given values, and Fz, which is the effort exerted by the actuator is properly selected to ensure a correct positioning of the object 1 with respect to the object 2.

It will also be added that the device according to the invention is capable of many applications. For example, it may be employed in automatic checking machines when it is necessary to frequently remove and reposition the measuring assemblies in order to pass from one object to the following one. It can also be used in the manufacture of objects in series as a means for positioning the objects in any machine-tool. It can also be employed as a means for positioning with high accuracy a removable tool, e.g. a precision boring spindle.

The invention therefore provides a device for relative positioning of two objects that is capable of a great number of applications and offers the following essential advantages over the prior solutions:

very high positioning accuracy of the objects 1 and 2 whatever the fixing accuracy of the means 10, 20 and 30, the only condition being that the axis y of the means 20 pass through the center O of the ball 14. It should be noted in this connection, that the accuracy is independent of the effort of application of the object 1 on the object 2 in a very wide range;

elimination of the risk of wear after successive repeated positionings which, in the long run, may alter the positioning of the objects;

elimination of the frictions due to the possible expansions caused by differences in temperature of the objects 1 and 2, since the device according to the invention uses an isostatic solution. Consequently, the positioning accuracy can in no way be disturbed;

and a relatively low cost due to the use of simple and inexpensive mechanical members.

Of course, the present invention is by no means limited to the form of embodiment described and illustrated which has been given by way of example only.

Thus, the intermediate elements 11, 12, 21, 22, 31 and 32 may be omitted without departing from the scope of the invention. Otherwise stated, the device according to the invention may be integrated in the objects 1 and 2. Likewise, the fixing of the said objects to the intermediate elements may perfectly be different from the one described.

The invention therefore comprises all technical equivalents to the means described as well as their combinations should the latter be carried out according to its gist and used within the scope of the following claims.

What is claimed is:

1. A device for the relative positioning of first and second objects through the medium of three points spaced from each other, comprising: a first ball connected with said first object and coming into contact with a corresponding hollow spherical supporting surface provided in said second object; a second ball connected with said first object and having a planar bearing surface formed thereon cooperating with a planar supporting surface provided on said second object; and at least one cylindrical supporting surface connected with said second object and cooperating with a cylindrical guiding abutment connected with said first object, said cylindrical guiding abutment having an axis which substantially passes through the center of said first ball.

2. A device according to claim 1, wherein said first object is provided with two spherical recesses to receive said first and second balls respectively, said second ball comprising a flat portion cooperating with said planar supporting surface provided on said second object, and wherein said cylindrical guiding abutment includes a cylindrical bar.

3. A device according to claim 2, wherein said two spherical recesses and said cylindrical bar are provided in and on intermediate elements connected with said first object respectively, and wherein the said spherical, planar and cylindrical supporting surfaces are provided in intermediate elements connected with said second object respectively.

4. A device according to claim 3, wherein each of said intermediate elements is fixed to the object to which it is connected by means of a screw.

5. A device according to claim 4, wherein said screw passes through centering rings disposed between the respective object and its associated intermediate element.

6. A device according to claim 3, wherein said first and second balls are retained in their respective recesses by respective annular members fixed to the respective intermediate elements and wherein at least said second ball is arranged to pivot in its associated recess.

7. A device according to claim 3, wherein the intermediate element with which the cylindrical bar is provided comprises a clevis or yoke supporting the bar, said clevis or yoke being keyed to said first object.

8. A device according to claim 3, wherein the intermediate element provided with said cylindrical supporting surface bears upon the cylindrical bar between two arms of said yoke.

* * * * *